United States Patent [19]
Yoshigi

[11] Patent Number: 5,941,716
[45] Date of Patent: Aug. 24, 1999

[54] COLLECTIVE CONNECTOR UNIT

[75] Inventor: Toshimasa Yoshigi, Shizuoka-ken, Japan

[73] Assignee: Yazaki Corporation, Tokyo, Japan

[21] Appl. No.: 08/841,568

[22] Filed: Apr. 30, 1997

[30]     Foreign Application Priority Data

May 29, 1996  [JP]  Japan .................................. 8-135433

[51] Int. Cl.⁶ .............................................. H01R 13/648
[52] U.S. Cl. .......................................... 439/95; 439/76.2
[58] Field of Search .............................. 439/92, 95, 101, 439/108, 76.2, 404, 949

[56]                 References Cited

U.S. PATENT DOCUMENTS

| 4,479,692 | 10/1984 | Greenwood et al. | 439/92 |
| 5,286,210 | 2/1994 | Kilsdonk et al. | 439/95 |
| 5,310,353 | 5/1994 | Parrish et al. | 439/76.2 |
| 5,653,607 | 8/1997 | Saka et al. | 439/76.2 |
| 5,722,851 | 3/1998 | Onizuka et al. | 439/76.2 |
| 5,759,050 | 6/1998 | Matsuoka et al. | 439/76.2 |

FOREIGN PATENT DOCUMENTS

| 1-98458 | 6/1989 | Japan . |
| 3-12472 | 2/1991 | Japan . |
| 4-135320 | 12/1992 | Japan . |

Primary Examiner—Hien Vu
Attorney, Agent, or Firm—Finnegan, Henderson, Farabow, Garrett & Dunner, L.L.P.

[57]                 ABSTRACT

A collective connector unit includes a case having a plurality of connector housings, a plurality of connector terminals accommodated in the connector housings, and a ground terminal fixture mounted on the case. For its earthing, the ground terminal fixture is electrically connected with the connector terminals through an earth circuit. With the arrangement where the connector terminals for earthing has been previously conducted with the ground terminal fixture through the earth circuit, the ground connecting of the unit can be effected with the fixing of the ground terminal fixture on the instrument, automatically.

6 Claims, 7 Drawing Sheets

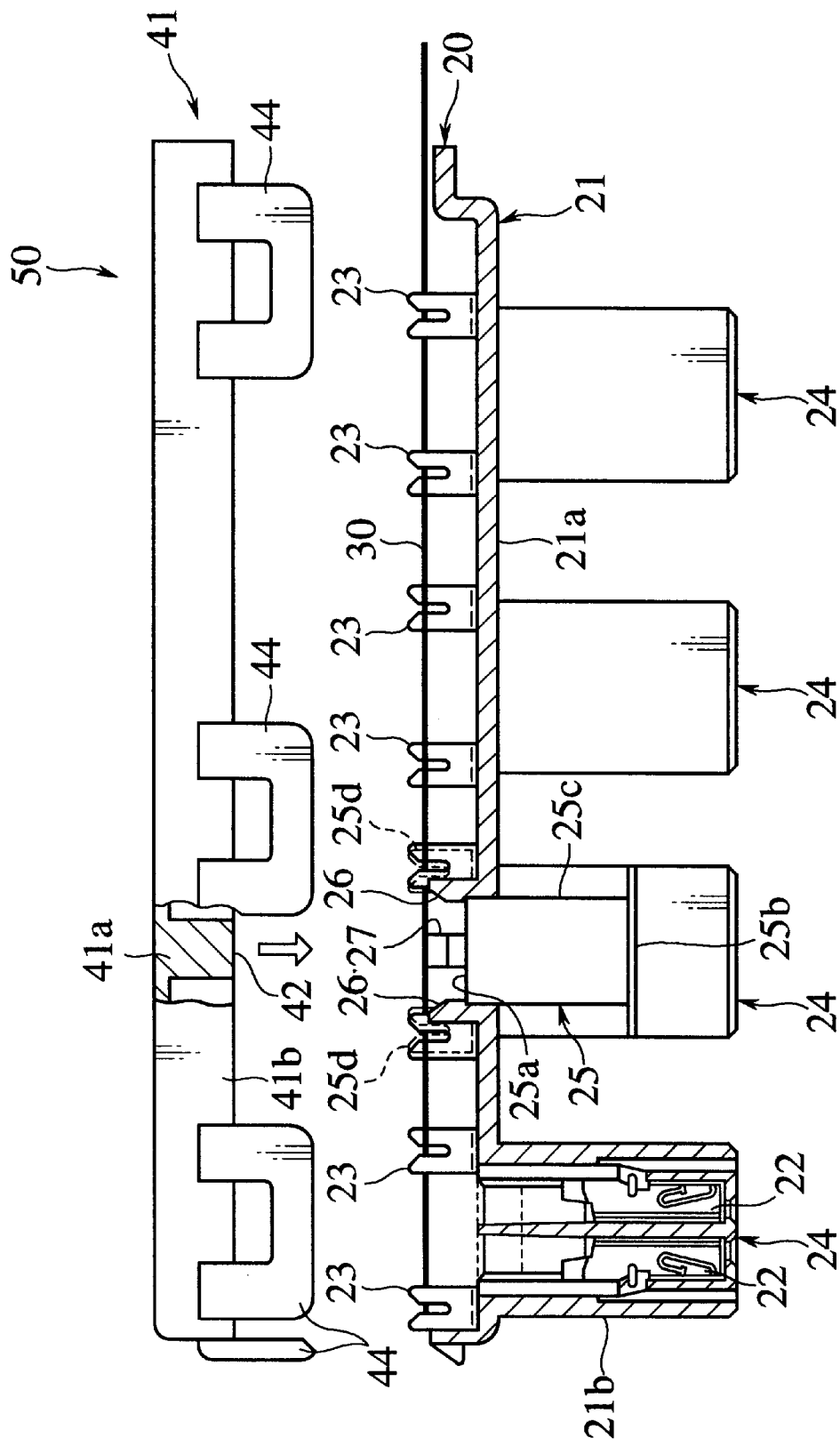

COLLECTIVE CONNECTOR UNIT

BACKGROUND OF THE INVENTION

The present invention relates to a collective connector unit which may be used for connecting a wire harness to solenoid valves of an automatic transmission unit of a vehicle, as an example.

When connecting a plurality of instruments, e.g. the solenoid valves, installed in the automatic transmission for the vehicle with the wire harness on the vehicle's side, it has been generally adopted a method of connecting them through the intermediary of connectors individually or directly connecting the end of the wire harness with terminals of the instrument by soldering or the like.

However, such a conventional method has a drawback of deteriorated effectiveness in assembling since it takes time to handle the wire harness and solder it.

SUMMARY OF THE INVENTION

Under such a circumstance, it is therefore an object of the present invention to provide a collective connector unit which is capable of connecting the wire harness with the plural instruments collectively and completing the ground connecting simultaneously with the fixing of the collective connector unit to the instrument of the vehicle.

The object of the present invention described above can be accomplished by a collective connector unit comprising:

a case having a plurality of connector housings moulded in one body with the casing;

a plurality of connector terminals for earthing, each of the connector terminal for earthing being accommodated in each of the connector housings to provide a connector in every connector housing; and a ground terminal fixture mounted on the case, the ground terminal fixture also serving as attachment fittings for the case;

wherein the ground terminal fixture is electrically connected with the connector terminals for earthing through a wire, thereby providing an earth circuit. In the collective connector unit mentioned above, with the arrangement where the connector terminals for earthing has been previously conducted with the ground terminal fixture through the earth circuit, the fixing of the collective connector unit on the instrument, such as a metallic casing of an automatic transmission unit, through the ground terminal fixture can produce the ground connection of the respective connectors automatically.

In the present invention, preferably, the ground terminal fixture and the connector terminals for earthing are respectively provided with pressure welding portions to which the wire constituting the earth circuit is fitted under pressure, whereby the ground terminal fixture is electrically connected with the connector terminals for earthing. In this case, if only fitting one ground wire (for earthing) to the respective pressure welding portions of the ground terminal fixture and the connector terminals under pressure, the whole ground connection in the collective connector unit can be completed.

It is preferable that the case comprises a case body and a cover locked on the case body for covering it, while the ground terminal fixture is composed of a base plate portion accommodated within and fixed with the case of the collective connector unit, and a fixing plate portion projecting to the outside of the case and having a bolt hole formed therein.

Further, it is preferable that the cover is provided with a pusher which depresses the base plate portion of the ground terminal fixture against the case body when the cover is locked on the case body. In the above case, the structure of the case composed of the case body and the cover permits a worker to accomplish the wiring work while opening the case body. Further, since the pusher on the cover depresses the base plate portion of the ground terminal fixture against the case body when the cover is locked on the case body, the supporting strength against the ground terminal fixture can be enhanced. Again, when the collective connector unit is fixed on the instrument by use of the ground terminal fixture, it is possible to increase the fixing strength of the collective connector on the instrument.

In the above-mentioned unit, preferably, the case further comprises an attachment bracket which is made of a resinous material identical to that of the case and which is formed so as to project from the case body along the fixing plate portion of the ground terminal fixture in order to reinforce it. In this case, since the fixing plate portion of the ground terminal fixture is reinforced by the resinous material, the strength of the ground terminal fixture itself can be enhanced. Therefore, it is also possible to increase the fixing strength of the collective connector unit under condition that the ground terminal fixture is fixed on the instrument by bolts.

More preferably, a portion of the ground terminal fixture is embedded in the resinous material so that the ground terminal fixture is integrated with the case. In this case, owing to the integration of the ground terminal fixture with the case, the mounting strength of the ground terminal fixture against the instrument can be increased. In addition, there is no need to handle the fixture separately.

Preferably, the fixing plate portion is exposed on the top surface of the attachment bracket and provided, on an inner periphery of the bolt hole, with a cylindrical collar which extends up to the under surface of the attachment bracket. Owing to the provision of the collar about the bolt hole, the resinous material adjacent to the bolt hole can be reinforced. Furthermore, with the arrangement where the lower end of the collar projects from the under surface of the resinous member, it is possible to conduct the fixture with the casing through the intermediary of the bolt in case of fixing the attachment bracket on the casing by the bolt. Similarly, it is also possible to conduct the ground terminal fixture with the casing through the portion of the collar in contact with the casing.

Furthermore, according to the present invention, there is also provided a connector assembly comprising, in combination:

an automatic transmission unit comprising:
  a metallic casing; and
  a plurality of first connectors installed in the metallic casing; and
a collective connector unit comprising:
  a case having a plurality of connector housings moulded in one body with the casing;
  a plurality of first connector terminals for earthing, each of the first connector terminal for earthing being accommodated in each of the connector housings to provide a second connector in every connector housing; and
  a ground terminal fixture mounted on the case, the ground terminal fixture also serving as attachment fittings for the case;
  wherein the ground terminal fixture is fastened to the metallic casing of the automatic transmission unit by bolts;

the second connectors of the collective connector unit are engaged with the first connector of the automatic transmission unit, respectively; and the collective connector unit further comprises a plurality of second connector terminals for connection with instruments on the automatic transmission unit's side, the second connector terminals being accommodated in the connector housings, respectively and being connected with a wire harness extending to the instruments.

In this connector assembly, by fixing the ground terminal fixture on the metallic casing of the automatic transmission unit, it is possible to complete the ground connection of the second connectors. In this state, by connecting the first connectors on the automatic transmission unit's side with the second connectors of the collective connector unit, it is possible to connect the wire harness with the instruments.

These and other objects and features of the present invention will become more fully apparent from the following description and appended claims taken in conjunction with the accompany drawing.

BRIEF DESCRIPTION OF THE DRAWINGS

FIG. 2 is a front view of the collective connector unit having a cover detached from a case;

DESCRIPTION OF THE PREFERRED EMBODIMENT

Figure 1:
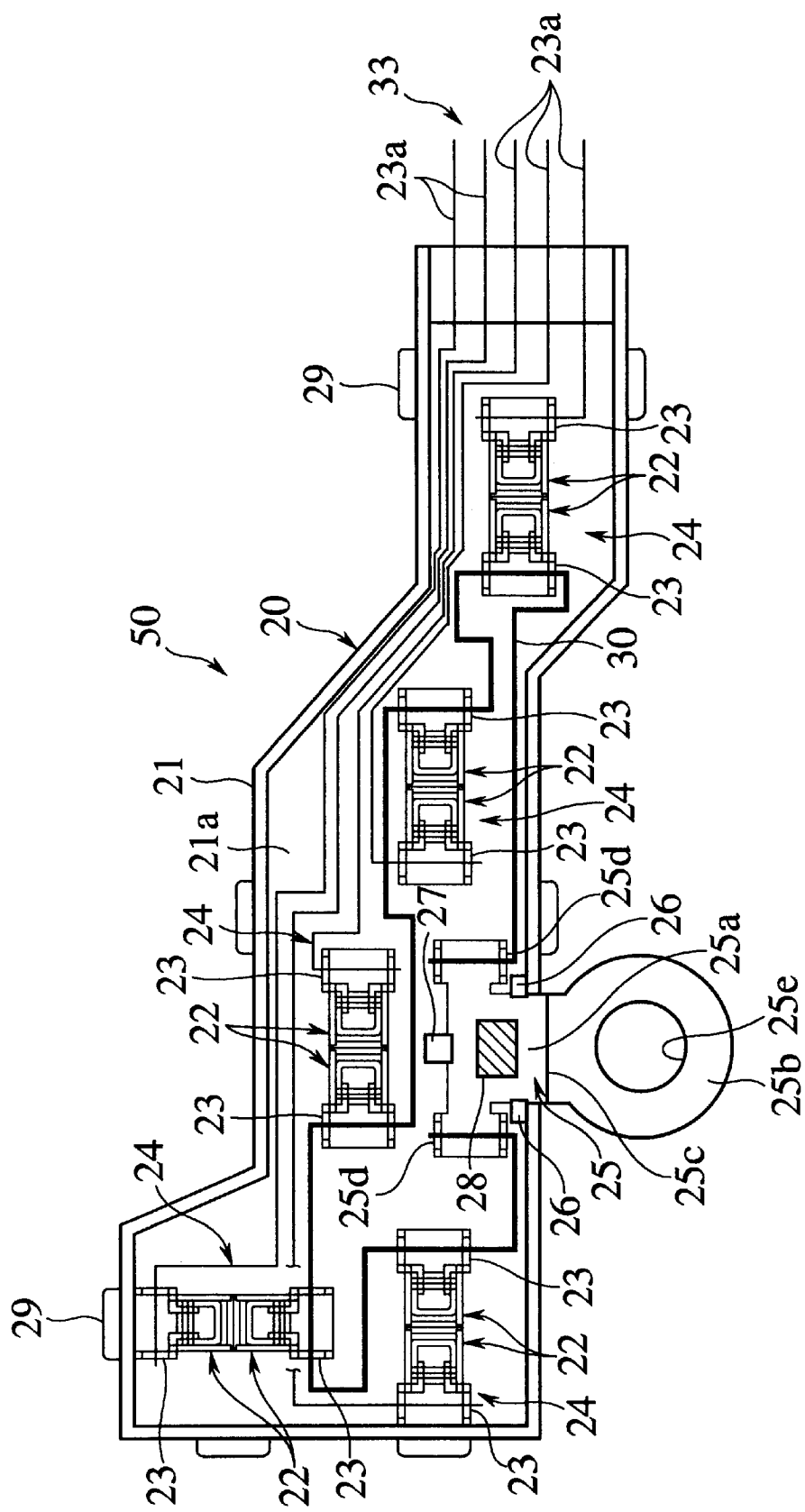
FIG. 1 is a plan view of a collective connector unit in accordance with an embodiment of the present invention, showing an interior of the unit.
Figure 3A:
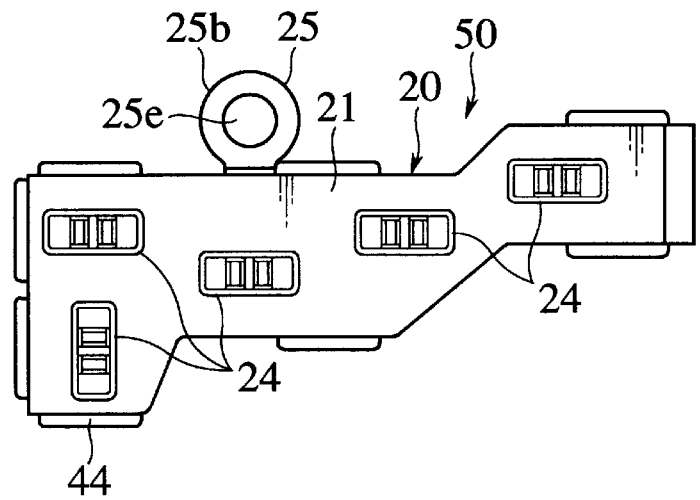
FIG. 3A is a plan view of the assembled collective connector unit of the embodiment.
Figure 3B:
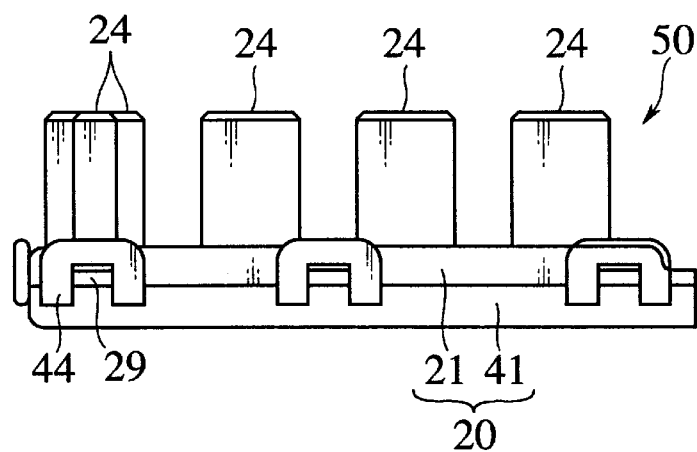
FIG. 3B is a front view of the assembled collective connector unit of FIG. 3A.
Figure 3C:
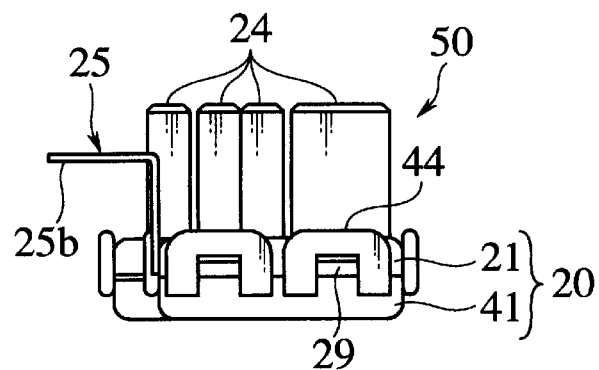
FIG. 3C is a side view of the assembled collective connector unit of FIG. 3A.
Figure 4:
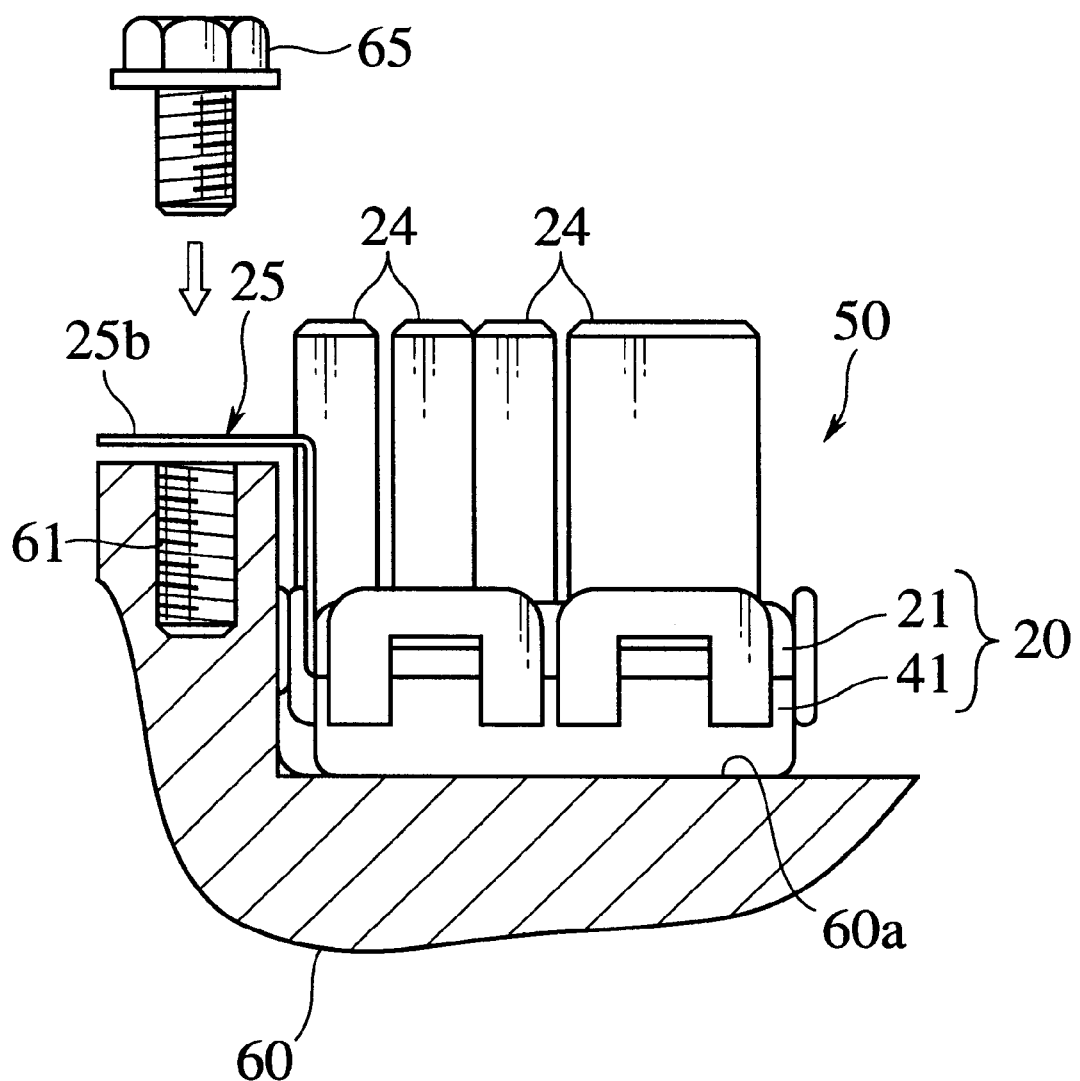
FIG. 4 is a side view of the collective connector unit of the embodiment, showing a condition that the unit is mounted on an instrument.
Figure 5:
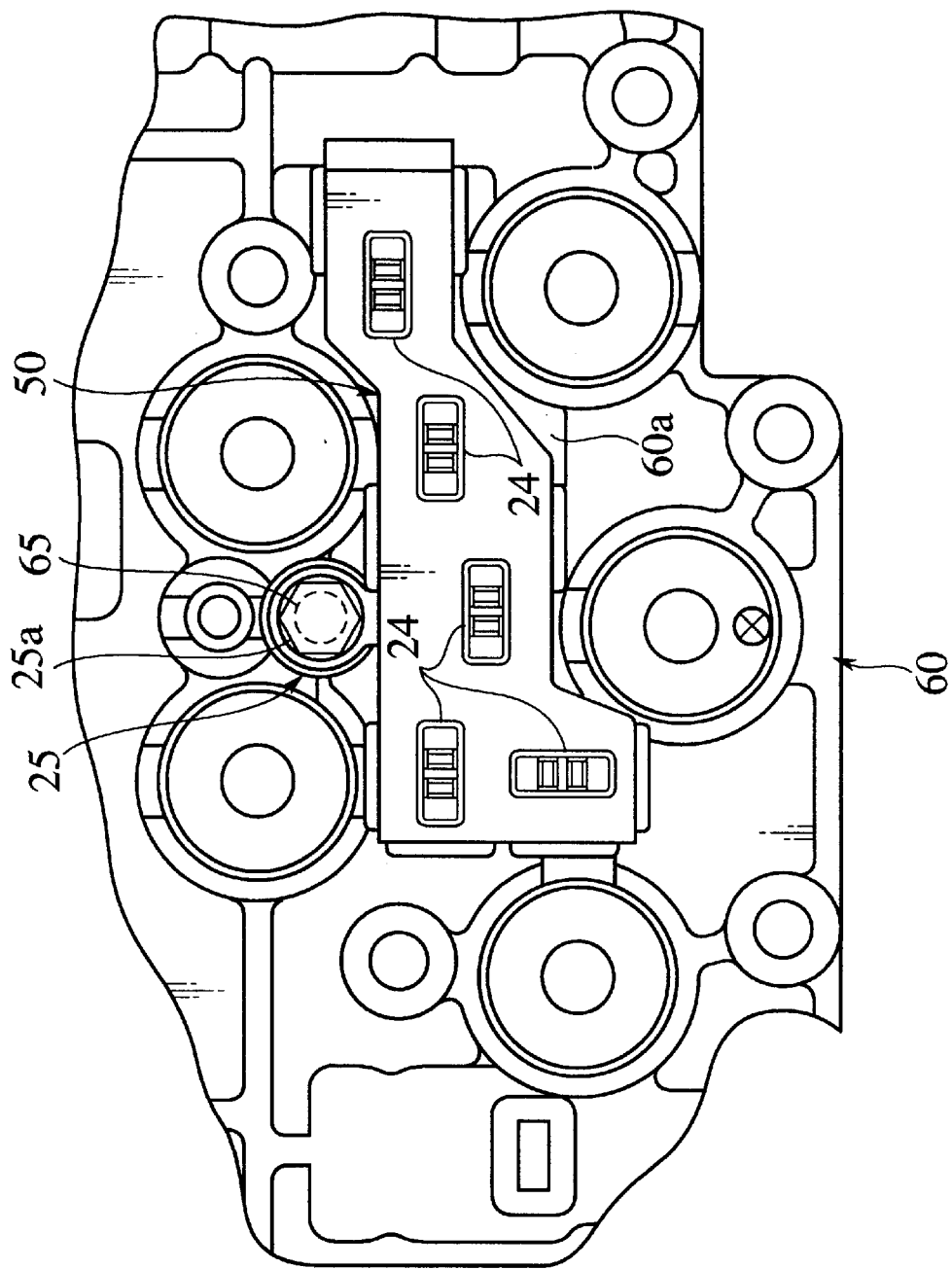
FIG. 5 is a plan view of the collective connector unit of the embodiment, showing a condition that the unit is mounted on an instrument.

Embodiments of the present invention will be described with reference to drawings. In figures, FIG. 1 is a plan view of a collective connector unit 50 of the embodiment, showing an interior of the collective connector unit 50. Further, FIG. 2 shows a condition that a cover 41 of the collective connector unit 50 is detached, FIG. 3A a plan view of the collective connector unit 50, FIG. 3B a front view the unit 50 and FIG. 3C is a side view of the unit 50.

The collective connector unit 50 of the embodiment is accommodated in a connector accommodating portion of an automatic transmission unit for connecting solenoid valves in the automatic transmission unit with a wire harness 33 electrically. Note, the automatic transmission unit will be described later.

The collective connector unit 50 includes a case 20 which is made of a synthetic resinous material and shaped of a polygon projecting a substantial oblong in the plan view. The case 20 is composed of a case body 21 and a cover 41 for covering the case body 21. The case body 21 has a plurality of locking projections 29 formed on the outer periphery, while the cover 41 has a plurality of locking frames 44 formed on the outer periphery for respective engagement with the projections 29. When the case body 21 and the cover 41 are integrated with each other, they define a low inner space between opposing face plates 21a and 41a.

Being integral with the face plate 21a of the case body 21 and in the form of rectangular tubes with bottoms, a plurality of connector housings 21b are formed so as to protrude toward the opposite side of the cover 41. The connector housings 21b are arranged in respective positions where corresponding connectors on the side of the solenoid valves can be connected easily.

In arrangement, two female connector terminals 22 are accommodated in terminal accommodating chambers formed in each connector housing 21b. Both of the connector housing 21b and the female connector terminals 22 constitute a second connector 24 (i.e. a male connector) to be fitted to a not-shown first connector (i.e. a female connector) on the side of the solenoid valves of the automatic transmission unit.

Integrally formed with each connector terminal 22 is a pressure welding portion 23 with a groove into which a wire is to be fitted under pressure. The pressure welding portion 23 is arranged at a base of the connector terminal 22 so as to be accommodated in the inner space of the case 20.

A ground terminal fixture ( i.e. earth terminal fittings) 25 is attached to an interior face of the case body 21. The ground terminal fixture 25, which also serves as metal fittings of the collective connector unit 50, is laterally arranged at a substantial center of the case 20 in the longitudinal direction (corres. to left and right directions in FIG. 1) so that the collective connector unit 50 can be carried under its well-balanced condition.

The ground terminal fixture 25 is made by folding a sheet of metal plate and comprises an oblong base plate portion 25a disposed on the face plate 21a of the case body 21 and a fixing plate portion 25b extending from the oblong base plate portion 25a through the intermediary of a folded plate portion 25c. The base plate portion 25a is secured, at three peripheral points thereof, to engagement hooks 26, 26, 27 projecting from the face plate 21a. Of the three points, two engagement hooks 26, 26 press two opposing sides of the oblong base plate 25a, while the remaining engagement hook 27 presses the remaining side of the oblong base plate portion 25a, which is opposite to the fixing plate portion 25b. Further, the base plate portion 25a is provided, on both sides in the width's direction, with pressure welding portions 25d, 25d for earthing. Projecting from the case 20 outward, the fixing plate portion 25b in the form of an annular plate is provided with a bolt hole 25e and arranged in parallel with the face plate 21a.

As to two connector terminals 22, 22 constituting each connector 24, one terminal 22 is the same for electrical connection with a wire harness 33 on the side of a vehicle body and the other terminal 22 is the same for earthing. A ground wire 30 consisting of a covered wire is pressure-welded into the pressure welding portion 23 of the connector terminal 22 for earthing and the pressure welding portion 25d of the ground terminal fixture 25, successively. Through the intermediary of the ground wire 30, all of the connector terminals 22 for earthing are electrically connected with the ground terminal fixture 25. Note, the respective wires 23a constituting the wire harness 33 are pressure-welded with the remaining pressure welding portions 23 of the connector terminals 22, respectively.

Under such a wired condition, the case body 21 is covered with the cover 41, so that both elements are integrated with each other by the engagement of the locking projections 29 with the locking frames 44. Then, a projection (pusher) 42 projecting from the inner surface of the face plate 41a of the cover 41 operates to depress a center portion 28 of the base plate portion 25a of the ground terminal fixture 25, so that the ground terminal fixture 25 can be retained in the case 20 certainly. Again, the wire harness 33 is drawn out from the end of the case 20 in the longitudinal direction.

When fixing the above-constructed collective connector unit 50 on the automatic transmission unit, the base plate portion 25a of the ground terminal fixture 25 is adjusted to a screw hole 61 in a metallic casing 60 of the automatic transmission unit while abutting the cover 41 on a connector accommodating portion 60a of the metallic casing 60. Then, a bolt 65 is screwed into the screw hole 61 to fix the ground terminal fixture 25 on the casing 60. Consequently, simultaneously with the fixing the collective connector unit 50 on the automatic transmission unit, the ground terminal fixture 25 can be conducted with the metallic casing 60, so that the ground connecting, i.e. earthing of the collective connector unit 50 can be completed through the vehicle body.

Thereafter, the connectors of the solenoid valves on the automatic transmission unit are fitted to the connectors 24 of the collective connector unit 50, so that the connecting between the solenoid valves and the wire harness 33 can be completed.

In this way, by making use of the collective connector unit 50 allowing the connectors on the solenoid valves' side to be fitted collectively, there can be no need to take the wire harness around for every solenoid valves and connect it by means of soldering etc., so that the simplification of assembling process can be progressed. Again, according to the embodiment, since the ground connecting of the respective connectors 24 can be effected simultaneously with the fixing of the collective connector unit 50 by bolt-fastening the ground terminal fixture 25, there is no need to connect the connector 24 to the ground individually. Therefore, the earthing operation can be simplified.

Particularly, since the connector terminals 22 and the ground terminal fixture 25 are provided with the pressure welding portions 23 and 25d respectively, a worker has only to fit one wire 30 into the portions 23, 25d under pressure in order to complete the whole ground connection in the collective connector unit 50. Thus, it is possible for the worker to assemble the collective connector unit 50 itself with ease.

Figure 6:
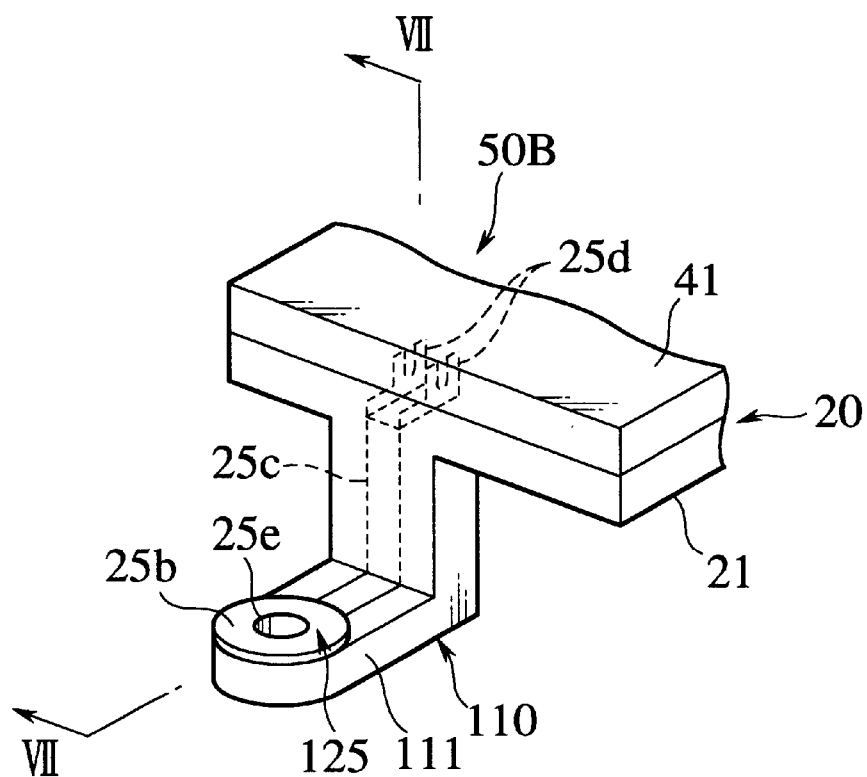
FIG. 6 is a perspective view showing a part of the collective connector unit in accordance with another embodiment.
Figure 7:
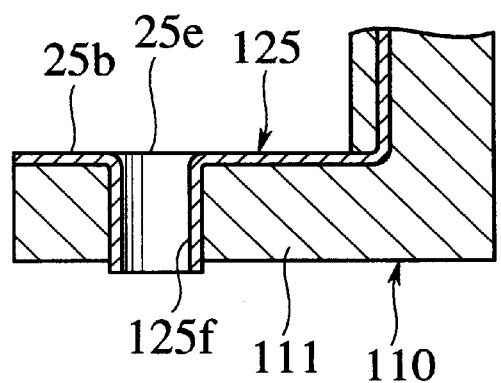
FIG. 7 is a cross sectional view of the collective connector unit, taken along a line VII—VII of FIG. 6.
Figure 8:
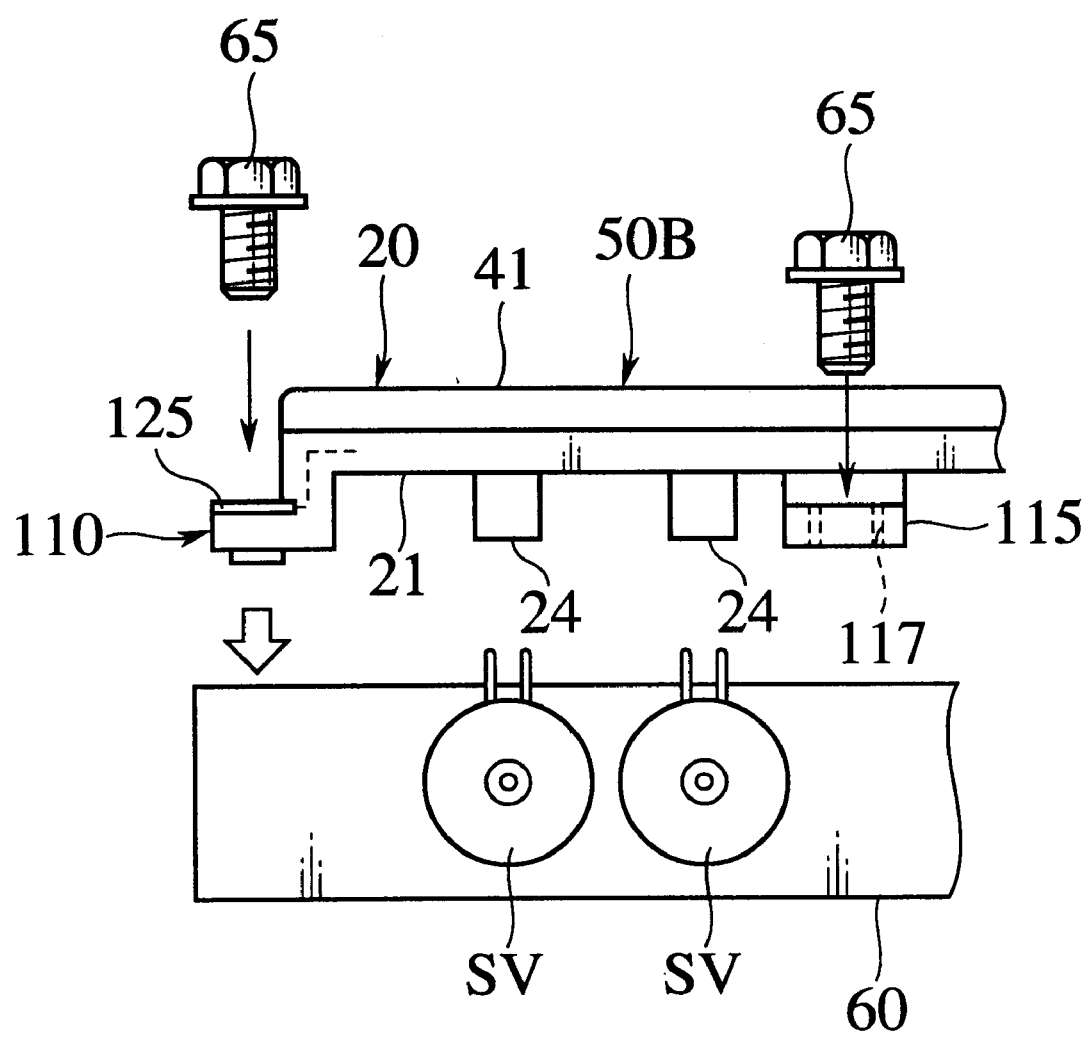
FIG. 8 is a side view of the collective connector unit of FIG. 6, showing a condition that the unit is mounted on a metallic casing of an instrument.

With reference to FIGS. 6 to 8, another embodiment of the invention will be described hereinafter. Note, in this embodiment, elements similar to those in the above-mentioned embodiment are indicated with the same reference numerals respectively and therefore, descriptions of the similar elements are deleted.

In the figures, reference numeral 50B designates a collective connector unit in accordance with the embodiment. As shown in FIG. 6, the collective connector unit 50B is provided with a ground terminal fixture 125 which is embedded in an attachment bracket 110 projection from the case body 21. The attachment bracket 110 is moulded in integral with the case body 21. In moulding, the ground terminal fixture 125 are embedded in the case body 21 as an insert material. The attachment bracket 110 is formed to project from an under surface of the case body 21 laterally, providing a resinous member 111 which serves to reinforce the ground terminal fixture 125. The fixing plate portion 25b of the ground terminal fixture 125 is exposed on the upper surface of the attachment bracket 110. On an inner periphery of the bolt hole 25e formed at the center of the fixing plate portion 25b, a cylindrical collar 125f is formed to extend up to the under surface of the reinforcement resinous member 111. Note, the lower end of the collar 125f is positioned so as to project from the under surface of the member 111 slightly.

As shown in FIG. 8, among the plural attachment brackets of the collective connector unit 50B, one is the above-mentioned attachment bracket 110 which has the ground terminal fixture 125 integrally formed therein and the others are the attachment brackets 115 each of which has a reinforcement collar 117 fitted therein by press-fitting or insert-moulding.

In the collective connector unit 50B of the embodiment, since the ground terminal fixture 125 is integrated with the case body 21 by embedding the former in the latter, the supporting strength against the ground terminal fixture 125 cannot only be progressed but the handling of the components can be facilitated because of no need of sequent installation of the ground terminal fixture 125. Additionally, as the exposed portion of ground terminal fixture 125 to the outside of the case 20 is reinforced by the resinous member 111 constituting the case body 21, it is possible to enhance the supporting strength against the ground terminal fixture 125, while increasing the fixing strength for the collective connector unit 50B under condition that the attachment bracket 110 is fixed on the casing 60 of the automatic transmission unit by means of the bolts 65.

Again, since the ground terminal fixture 125 is provided in integral with the collar 125f, it is possible to accomplish the reinforcing of the resinous material 111 under condition that the bolt 65 is fastened into the attachment bracket 110. Furthermore, since the lower end of the collar 125f projects from the under surface of the resinous member 111 while exposing the fixing plate portion 25b of the ground terminal fixture 125 on the upper surface of the attachment bracket 110, it is possible to conduct the fixture 125 with the casing 60 through the intermediary of the bolt 65 in case of fixing the attachment bracket 110 on the casing 60 by the bolt 65. Similarly, it is also possible to conduct the ground terminal fixture 125 with the casing 60 through the portion of the collar 125 in contact with the casing 60.

Although both of the above-mentioned embodiments are concerned with the case that the collective connector unit 50 is assembled to the automatic transmission unit in common, of course, the unit 50 may be applicable to other units for the vehicle.

Finally, it will be understood by those skilled in the art that the foregoing description is related to some preferred embodiments of the disclosed collective connector unit, and that various changes and modifications may be made to the present invention without departing from the spirit and scope thereof.

What is claimed is:

1. A collective connector unit comprising:
   a case having a plurality of connector housings integrally molded with said case;
   a plurality of connector terminals for grounding, each of said plurality of connector terminals being mounted in each of said plurality of connector housings; and a ground terminal fixture mounted on said case and being usable as a fitted attachment for said case, said ground terminal fixture being electrically connected with each of said plurality of connector terminals through a ground wire and being capable of collectively grounding said plurality of connector terminals, thereby defining a grounding circuit, said ground terminal fixture and said connector terminals having pressure welding portions for pressure-fitting said wire so that said ground terminal fixture is electrically connected with said connector terminals to be grounded.

2. A collective connector unit as claimed in claim 1, wherein said case comprises a case body and a cover for locking on said case body, and said ground terminal fixture having a base plate portion fixed within said case and a fixing plate portion projecting outwardly from said case and having a bolt hole formed therein, and said cover has a pusher for pressing said base plate portion against said case body when said cover is locked on said case body.

3. A collective connector unit as claimed in claim 2, wherein said case further comprises an attachment bracket which is made of a resinous material identical to that of said case and which is formed so as to project from said case body along said fixing plate portion of said ground terminal fixture in order to reinforce it.

4. A collective connector unit as claimed in claim 3, wherein a portion of said ground terminal fixture is embedded in said resinous material, whereby said ground terminal fixture can be integrated with said case.

5. A collective connector unit as claimed in claim 4, wherein said fixing plate portion is exposed on a top surface of said attachment bracket and provided, on an inner periphery of said bolt hole, with a cylindrical collar which extends up to an under surface of said attachment bracket.

6. A connector assembly comprising, in combination:
   an automatic transmission unit comprising:
      a metallic casing;
      electrical instruments of the automatic transmission; and
      a plurality of first electrical connectors installed in said metallic casing; and
   a collective connector unit comprising:
      a case having a plurality of connector housings integrally molded with said case;
      a plurality of first connector terminals for connection with a ground wire, each of said plurality of first connector terminals being mounted in each of said plurality of connector housings defining a second electrical connector, each of said second electrical connectors being engaged with each of said plurality of first electrical connectors; and
      a ground terminal fixture mounted on said case and usable as a fitted attachment for said case, said ground terminal fixture being fastened to said metallic casing of said automatic transmission unit by bolts; and
      a plurality of second connector terminals for connection with said instruments of the automatic transmission unit, each of said second connector terminals being mounted in each of said plurality of connector housings and being connected with a wire harness extending to said instruments.

\* \* \* \* \*